July 9, 1929.   C. SCHIEBELER   1,719,855
AUTOMATIC MOTOR CONTROL SYSTEM
Filed Jan. 13, 1927
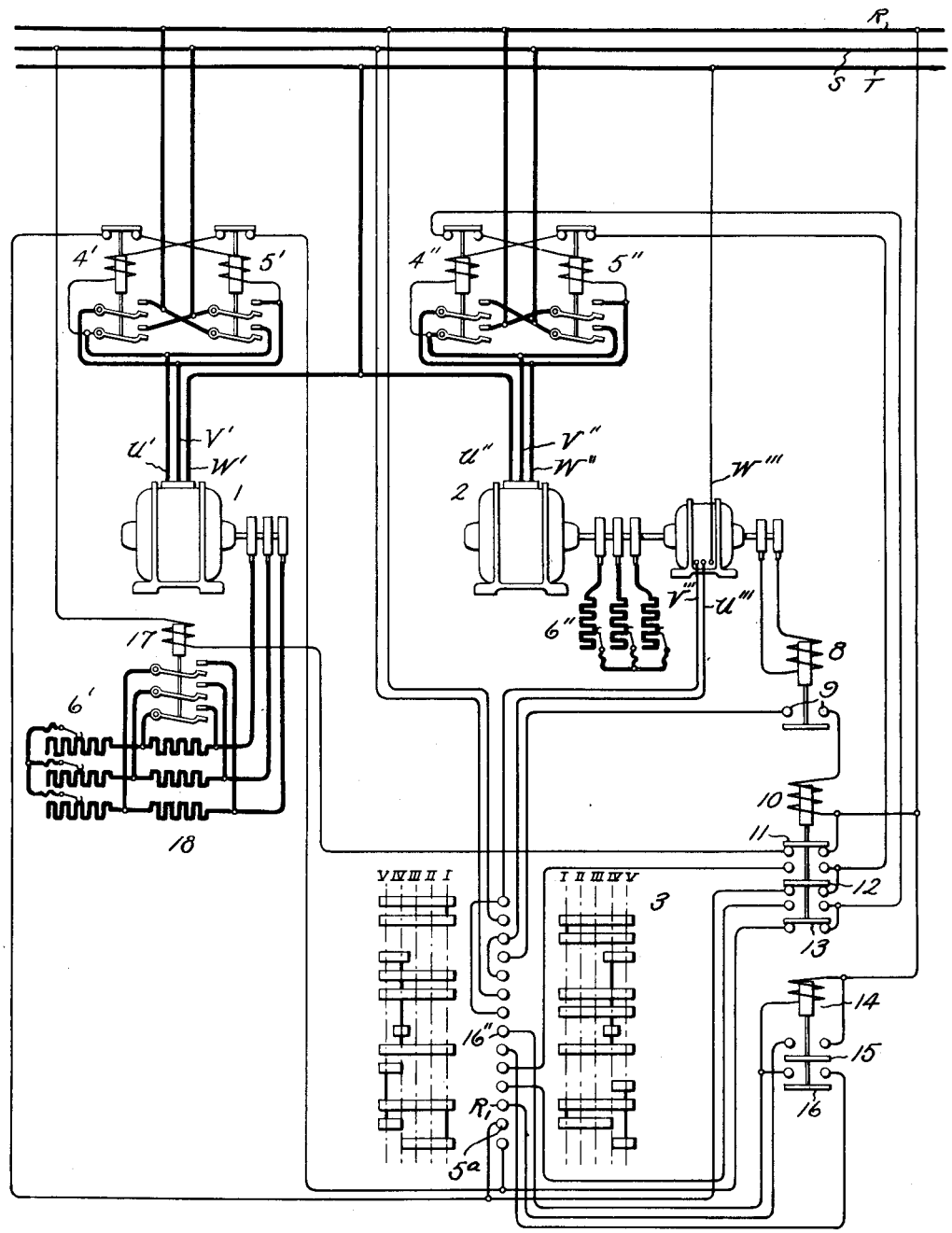
Inventor:
Carl Schiebeler,
by *Alexander S. ...*
His Attorney.

Patented July 9, 1929.

1,719,855

UNITED STATES PATENT OFFICE.

CARL SCHIEBELER, OF BERLIN, GERMANY, ASSIGNOR TO GENERAL ELECTRIC COMPANY, A CORPORATION OF NEW YORK.

AUTOMATIC MOTOR-CONTROL SYSTEM.

Application filed January 13, 1927, Serial No. 160,992, and in Germany January 28, 1926.

Speed regulation of polyphase induction motors is ordinarily effected by resistances, which are connected into the rotor circuit. If the motor has to exert a driving torque, then the rotor speed is decreased by connecting the resistances in the rotor circuit. If, however, the motor is driven by the driving gear, as happens when the vehicle driven by the motor is on a down grade, then inserting resistance in the rotor circuit produces an increase of the speed beyond the synchronous speed of the motor. This speed becomes the greater, the greater the driving force and the number of ohms of the resistance. To obtain with this negative force a reduction of the motor speed below the synchronous, a reverse or braking operation connection is used, that is, the stator winding of the motor is so connected up that the rotary field moves oppositely to the direction of rotation of the rotor. Use is made of this reverse connection in crane drive, by providing special positions on the controller drum for the motoring operation, and for the reverse connection. It is the duty of the operator to produce according to the existing operating conditions, the one or the other kind of connection. A clearing bridge conveyor crane drive, for example, presents problems for which the present invention provides a solution, since in such a crane the operator either on account of the great dimensions of the crane or because he is otherwise busied, cannot directly see whether the motor should act to drive or to brake. Clearing conveyor cranes may, for example, in an uneven locality come upon a down grade, without having the operator notice the increase in speed at once, which may develop if he has the control device on one of the motoring positions with the resistance in series in the motor circuit. With the large bulk of such a crane and the danger of too great a lead of the one crane leg as compared to the second crane leg working under other conditions, this increase of speed must be absolutely prevented and it will even be desirable to reduce the speed to a lesser value than that of the normal speed.

In accordance with the present invention the exceeding of a certain speed limit is prevented and a decrease of the speed is obtained upon reaching the highest permissible speed by automatically connecting the motor in the reverse or braking connection through the operation of means responsive to the speed. When the proper braking effect occurs the speed control resumes its former position and the motor is again switched back into the motoring direction. If the drop in grade or the pressure of the wind continue, then the speed again increases so that the motor is connected for reverse operation and the alternate switching from work to reverse operation and back to work will repeat itself periodically so long until the crane again comes into a stretch without a decline, or the wind pressure ceases. The arrangement has above all the advantage that the braking obtained by the periodical switching about adapts itself automatically to the magnitude of the driving force. As the counter current braking acts very smoothly and without shock to the driving gear, it is possible, to choose the counter braking force of a sufficient strength. With small driving forces the braking to the lower speed limit will then occur more quickly, but the motor will take a longer time until it again speeds up to the higher speed limit; that is, the number of brake impulses will be smaller. With larger driving forces the number of brake impulses will increase, so that the medium speed obtained will remain approximately alike.

The speed control can be made advantageously as electroresponsive means including a voltage relay. With the latter the calibration can be varied within certain limits so as to accurately take into consideration the conditions encountered. If the voltage relay is allowed to release at only a speed of the motor slightly above synchronous speed, and if a dropping off voltage is chosen which corresponds to a speed as far as possible below synchronism, then a sufficiently decreased speed can be obtained. When the motor speed is a value between zero and synchronism, the voltage decreases from the value at stoppage to zero, but this voltage increases between synchronism and double the synchronous speed from zero to the stoppage voltage, so that thus the separate values of the voltage repeat themselves. Therefore, the adjustment of the voltage relay to a certain value between the zero and stoppage voltage will always give two releasing speeds. This disadvantage is avoided by the use of a small polyphase motor with slip ring rotor coupled with the driving gear as a voltage source and to the rotor terminals of which the coil ends of the voltage relay are connected. The rotary field of the small motor is always connected oppositely to the direction of the running gear. In this manner the small motor serves as a generator of voltage and the voltage thereof varies proportionally with the speed of the driving gear.

In clearing conveyor cranes two or more motors are generally used, especially for the running gear on the side of the dump, which consists of two or several trucks connected with the crane support by a turning frame, the total output of the motors corresponding to the working output of one crane side. In this arrangement it is advisable to connect over only the one or the other part of the motors into reverse connection, and to leave the other in operation in the motoring direction but with the resistance in series. The single figure of the accompanying drawing illustrates a control system embodying these features. As a drive for the one crane side there here serve the two motors 1 and 2. 3 represents the controller drum which advantageously controls both motors together. For the simplification of the drawing there is omitted the contact arrangement for the switching of the rotor resistances 6', 6''. The stator phases U', V', W' and U'', V'', W'' of the two motors 1 and 2 are connected by the contactors 4' and 4'' for the forward run and by the contactors 5' and 5'' for the backward run. The stator phases U''', V''', W'''' of the voltage indicator motor are directly connected, on account of the small capacity of the motor, by corresponding contact fingers of the controller drum so that this motor always acts oppositely to the direction of the running drive. The voltage relay 8 has the contacts 9 which control an auxiliary contactor 10 provided with auxiliary contacts 11, 12, 13. The auxiliary contactor 14 makes the reverse operation positions I-III, which are arranged before the working positions IV and V into zero positions when advancing the controller drum and only when switching back from the working positions allows positions I, II and III to become effective. The upper contact 15 of contactor 14 which connects the contact finger $R_1$ on the controller with the line system, can be caused to open only on the off position of the drum. That is because this contactor is picked up at controller position IV through contact 16'', whereupon it then feeds itself by the self-feeding contacts 16 independently of the contact finger 16'' in all operative positions of the drum. A further contactor 17 serves for the shunting of the resistance 18, which serves for the decrease of the rotation momentum of the motor 1. Upon the automatic change in connection of motor 2, the motor 1 continues driving in the motoring sense.

The mode of operation of the control is as follows: When the controller drum is operated in the forward direction the reverse operation positions are moved over without producing any effect, and the operator can regulate the operation within certain limits on the power positions of the controller by means of the starting resistances. For the purpose of holding the crane, he returns to the reverse operation positions, which now become effective and allow of the braking of the motor and the reduction of the speed in a normal manner. If, upon the occurrence of forces which tend to drive the equipment independently of the driving gear, the operator leaves the drum on the first power positions, then when reaching the upper speed limit the contact 9 of the voltage relay 8 closes and the contactor 10 is energized. This circuit runs from phase R through the coil of contactor 10, contact 9 and the associated contact finger on the controller to phase S. The lower auxiliary contacts 12 of the contactor 10 break the circuit for the forward contactor of motor 2 and at the same time the circuit for the reverse contactor of motor 2 is closed through the upper auxiliary contacts 13 and an associated contact finger on the drum. Thus, the motor 2 is switched over for reverse operation. Here the connections for the opposite direction is advantageously made impossible in a well known manner until the arc, formed by the opening of the originally closed contactor, and which would cause a short-circuit between the stator phases, has become extinguished. Motor 1 is not switched over since the line to contactor 4' is not carried over the auxiliary contacts of contactor 10, but the contactor 17 is caused to drop open by the opening of contacts 11 on contactor 10. The resistance 18 is thereby put into the rotor circuit and the force of rotation of the motor reduced. When the speed of the crane decreases, then contact 9 of the voltage relay opens. The contactor 10 drops open and the original state of the connection is again established. If the operator should hold the first motoring position then the switching process is repeated so long, as the decline or the wind pressure act. The operator naturally has the capability to switch back to reverse brake positions at any time. In this by the passage from position IV to III the contactor 10 drops open in consequence to the opening of the circuit through the associated contact finger of the drum from the corresponding contact strip. A switching over of motor 2 for reverse operation does not occur as the circuit of the reverse contactor 5'' is now directly controlled by the contact finger $5^a$, by which motor 1 is also connected in the reverse connection. By the contact 11 of the contactor 10 the contactor 17 is also excited and the resistance 18 is again shunted. The operator can then exert a powerful braking by the two motors and bring the crane to a stop. For the opposite running direction the control processes take place exactly in the same manner.

What I claim as new and desire to secure by Letters Patent of the United States, is:—

1. In combination in a system of motor control, a source of supply, a motor which either drives a load or is driven thereby, switch mechanism for reversing the connection of said motor to said source to reverse the direction of the driving torque of the motor, and speed responsive means connected to effect automatic operation of said switch mechanism at predetermined limits of the speed of said motor to effect either a driving or a braking action of the motor depending on the speed thereof.

2. In combination in a system of motor control, a source of supply, a motor which either drives a load or is driven thereby, switch mechanism for reversing the connection of said motor to said source to reverse the direction of the driving torque of the motor, an auxiliary dynamo electric machine driven by said motor to provide a voltage responsive to the speed of the motor, and means governed by said machine for effecting automatic operation of said switch mechanism at a predetermined limit of the speed of the motor to effect a braking action.

3. In combination in a system of motor control, a source of supply, a motor which either drives a load or is driven thereby, switch mechanism for reversing the connections of said motor to said source to reverse the direction of the driving torque of the motor, a mutli-position manually operable reversing controller for controlling said switch mechanism, electroresponsive means governed in accordance with the speed of said motor, and connections through which with said controller in an operative position for either direction of motor operation, the said means automatically effects operation of said switch mechanism to reverse the connections of said motor to said source when the motor speed reaches a predetermined limit.

4. In combination in a system of motor control, a source of supply, a pair of alternating current motors which either drive a load or are driven thereby, at least one of said motors being provided with resistance arranged to be included in the rotor circuit thereof, switch mechanism for reversing the connection of the second of said motors to said source to reverse the direction of the driving torque thereof, speed responsive means, and connections through which said means effects operation of said switch mechanism to reverse the driving torque of said second motor and effects the inclusion of said resistance in the rotor circuit of said first motor.

In witness whereof, I have hereunto set my hand this 27th day of December 1926.

CARL SCHIEBELER.